United States Patent [19]

Locante

[11] Patent Number: 4,653,322
[45] Date of Patent: Mar. 31, 1987

[54] REMOTE LEVEL MEASUREMENT IN A SOLID-LIQUID SYSTEM

[75] Inventor: John Locante, Monroeville, Pa.

[73] Assignee: Westinghouse Electric Corp., Pittsburgh, Pa.

[21] Appl. No.: 752,271

[22] Filed: Jul. 5, 1985

[51] Int. Cl.$^4$ ............. G01F 23/16; B65B 1/36
[52] U.S. Cl. ................. 73/290 R; 73/149; 141/95; 376/249
[58] Field of Search ........... 73/290 B, 149; 376/249; 141/95

[56] References Cited

U.S. PATENT DOCUMENTS

| | | | |
|---|---|---|---|
| 2,664,747 | 1/1954 | Ellis | 73/290 B |
| 2,696,606 | 12/1954 | Pomelie | 73/299 X |
| 3,487,682 | 1/1970 | Whitehead, Jr. | 73/149 |
| 3,744,306 | 7/1973 | Krueger | 73/149 |
| 4,241,606 | 12/1980 | Vandenhoeck | 73/290 R |
| 4,394,346 | 7/1983 | Morooka | 376/247 X |
| 4,433,577 | 2/1984 | Khurgin et al. | 73/290 R |
| 4,461,327 | 7/1984 | Magin et al. | 141/95 X |
| 4,527,714 | 7/1985 | Bowman | 73/290 R |
| 4,567,761 | 2/1986 | Fajeau | 73/290 R |
| 4,598,742 | 7/1986 | Taylor | 141/95 |

FOREIGN PATENT DOCUMENTS 0148957 10/1961 U.S.S.R. ............ 73/290 B

Primary Examiner—Daniel M. Yasich
Attorney, Agent, or Firm—Daniel C. Abeles

[57] ABSTRACT

A method for remotely measuring the level of a bulk material in a vessel, wherein the bulk material comprises loose particles, with adjoining particles defining interstices therebetween. Liquid is added to the vessel at a constant flow rate through a liquid inlet of the vessel, wherein the liquid progressively fills the interstices of the bulk material from the bottom of the vessel to the surface level of the bulk material. The liquid level indications of a level measuring device are monitored as a function of time. The level at which the rate of change of liquid level in the vessel decreases is determined. Such level represents the surface level of bulk material in the vessel.

3 Claims, 1 Drawing Figure

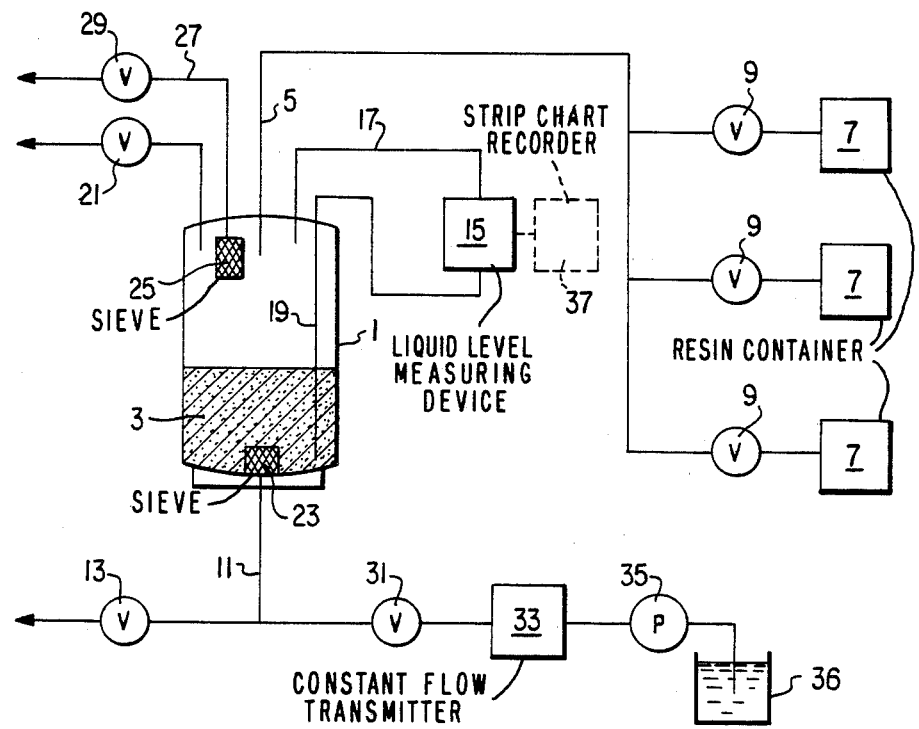

REMOTE LEVEL MEASUREMENT IN A SOLID-LIQUID SYSTEM

BACKGROUND OF THE INVENTION

1. Field of the Invention

The invention relates to a method for remotely measuring the level of a bulk material in a vessel. The method of the invention is particularly useful for remotely measuring the level of radioactive resin material which is temporarily stored in spent resin storage tanks so that the inventory of such radioactive resin material can be positively established.

2. Description of the Prior Art

In the normal operation of a nuclear reactor power plant, radioactive fission and corrosion products are generated by the reactor and transported by the reactor coolant. In order to maintain the radioactivity of the reactor coolant within an acceptable level, the reactor coolant is processed through various resins and filters. Over a period of time the efficiency of the resin for removing radioactivity from the coolant decreases and the resin must be replaced. Because the accumulated radioactivity in the resin results in radiation levels on the order of 1000 roentgens per hour, removal is accomplished remotely by flushing the resin from its container to a spent resin storage vessel.

The spent resin storage vessel is located on the site of the nuclear power plant and provides only temporary storage for the spent resin. Periodically the spent resin is emptied from the storage vessels and packed into shielded drums which are shipped away from the site of the nuclear power plant to a permanent storage location.

In order for plant operators to establish when a spent resin vessel should be emptied into shielded drums, and to determine the number of drums required in such an operation, it is necessary to have a means for positively establishing the inventory of spent resin in the spent resin storage vessel. However, because of the high radiation levels associated with spent resin, direct means are not available for measuring the level of the spent resin in the vessel.

In the past, various indirect techniques have been utilized to maintain inventory control of spent resin. For example, load cells have been used to measure the weight of the vessel as it is being filled with spent resin. By knowing the weight of the vessel when it is empty, the net weight of the spent resin can be obtained, from which, with a knowledge of the density of the resin, the volume of the resin can be derived. The use of load cells for maintaining inventory control, however, has proven to be ineffective because, among other reasons, the use of load cells has not produced the required accuracy. Another indirect technique for maintaining inventory control of spent resin is to maintain accurate records of all resins entering and leaving the nuclear plant. Such administrative procedures are time consuming and subject to error.

SUMMARY OF THE INVENTION

It is an object of the present invention to provide a simple and accurate method for the remote measurement of the level of bulk material in a vessel.

It is a more particular object of the invention to provide a method for remotely measuring spent resin in a spent resin storage vessel in a nuclear plant with the use of existing equipment already employed in connection with the spent resin storage vessel system.

The above and other objects of the invention are accomplished by a method for remotely measuring the surface level of a bulk material in a vessel, wherein the bulk material comprises loose particles whereby adjoining particles define interstices therebetween, the vessel has a liquid inlet and a liquid level measuring device is operatively associated with the vessel for producing an indication of the level of a liquid in the vessel, the method including: adding liquid to the vessel at a constant flow rate through the liquid inlet, the liquid progressively filling the interstices of the bulk material from the bottom of the vessel to the surface level of the bulk material; monitoring the liquid level indications of the level measuring device as a function of time; and determining the level at which the rate of change of liquid level in the vessel decreases, such level representing the level of bulk material in the vessel.

The invention thus takes advantage of the fact that a bulk material, such as a resin, has a certain void fraction comprised of the interstices between adjoining resin particles. For example, in a bulk material comprised of solid spherical particles of the same diameter, the void fraction of the total volume of bulk material is approximately one third of the total volume of bulk material. The remaining two thirds of the the bulk material comprises the solid spherical particles.

Thus, if the bulk material were disposed in a vessel, such as a right circular cylinder, and a liquid, having a lower specific gravity than the solid particles of the bulk material, were added to the vessel at a constant flow rate, one would observe that the level of liquid with respect to the vessel wall would rise at a much more rapid rate as it filled the interstices of the bulk material than the rate at which the level of the liquid would rise if the bulk material were not present in the vessel. For example, in the case where the bulk material is two thirds solid and one third void fraction, the liquid would rise through the bulk material three times the rate of which the liquid would rise in the same volume without the bulk material present. Accordingly, when the liquid reaches the surface of the bulk material and begins to occupy the remaining volume of the vessel, there will be an observable decrease in the rate of rise of the liquid level with respect to the vessel wall. In the foregoing example the rate of change of liquid level in the volume of the vessel not occupied by the bulk material would be one third of the rate of change of the liquid level in the volume of the vessel filled with the bulk material.

In view of the foregoing it may be appreciated by those skilled in the art that by remotely detecting the level at which the liquid level experiences a decrease in rate of change, it is possible to remotely detect the level of the bulk material in the vessel.

Further, if the dimensions of the vessel are known, the liquid level, and thus bulk material level, in the vessel can be readily calibrated to correspond to volume so that by knowing the level of the bulk material in the vessel, one also knows the volume of bulk material in the vessel.

The invention thus provides a simple and inexpensive method for remotely measuring the level of a bulk material in a vessel which is extremely advantageous when the level of bulk material must be determined with a high degree of accuracy and the vessel is inaccesible as in the case when the bulk material comprises a radioactive resin.

BRIEF DESCRIPTION OF THE DRAWINGS

The sole FIGURE illustrates a spent resin storage vessel and associated plumbing with respect to which the method according to the invention can be implemented.

DESCRIPTION OF THE PREFERRED EMBODIMENT

Referring to the FIGURE, there is shown a spent resin storage vessel 1 for storing a resin material 3 which is discharged into the vessel via a discharge pipe 5 which is connected to a plurality of resin containers 7 via respective valves 9. The resin containers are connected in the circulation path of the reactor coolant in a known manner for removing various fission products from the coolant to maintain the radioactivity of the coolant within an acceptable level. After a period of operation, the efficiency of the resin for removing radioactivity decreases to the extent that the resin must be replaced. To do this the resin is flushed from the containers 7 via valves 9 and discharge pipe 5 into the spent resin storage vessel 1.

Because the spent resin in the storage vessel 1 is highly radioactive, the vessel is appropriately shielded and is inaccessible for plant operators to directly measure the level of spent resins therein. The method according to the invention advantageously utilizes existing plant equipment for remotely determining the level of the spent resin in vessel 1 as will be described below.

The spent resin is flushed into vessel 1 by a water medium. In order to insure that the vessel 1 does not overflow with repeated flushing operations, the water is periodically drained from the vessel via a pipe 11 and valve 13 when the level of the water in the vessel reaches a predetermined level as measured by a liquid level measuring device 15. The liquid level measuring device 15 is a conventional instrument and may comprise, for example, a level measuring instrument made by ITT Corporation, Barton Instruments Company, and sold as Model No. 752/352. Briefly, such an instrument includes a diaphragm (not shown) which is displaced as a result of a pressure differential on the opposite sides thereof. The pressure differential is imparted to the opposite sides of the diaphragm by respective tubes 17 and 19. Tube 17 is in communication with the atmosphere at the top of vessel 1 which is maintained at a constant pressure by constant pressure valve 21. Generally, nitrogen is utilized as the pressurizing atmosphere in the vessel. Tube 19 is in communication with the bottom of vessel 1. As the water level increases, the diaphragm is displaced in response to the pressure exerted on the side of the diaphragm in communication with tube 19, such pressure being directly proportional to the height of the water level, since the pressure on the other side of the diaphragm is maintained constant via tube 17 which is in communication with the constant pressure atmosphere above the liquid level. As noted above, when the liquid level reaches a predetermined height, the water is drained through pipe 11 and valve 13 and discharged into a reservoir (not shown). Preferably, a sieve 23 made of stainless steel and having a mesh size smaller than the particle size of the resin beads is connected to the end of pipe 11 in vessel 1 for preventing the resin from being drained out with the flushing water. As an example, the resin beads may have a particle size of 200 microns, while the sieve's mesh size is 105 microns.

As a fail safe measure, a similar sieve 25 is disposed near the top of vessel 1 and is connected to an overflow pipe 27 and valve 29 via which the flushing water in vessel 1 can be discharged to the reservoir in the event that the valve 13 is inoperable or not opened in time to drain the flushing water out of vessel 1 before it reaches the overflow point.

Pipe 11 is also connected via a further valve 31, a constant flow transmitter 33 and a water pump 35 to a source of water 36 which can be pumped into vessel 1 at a constant flow rate as determined by the constant flow transmitter 33. Constant flow transmitter 33 is also a known device which could be, for example, a flow measurement instrument made by ITT Corporation, Barton Instruments Company as Model No. 752 (0-150 GPM).

The method according to the invention is implemented in connection with the spent resin storage vessel system illustrated in FIG. 1 as follows. Initially, valve 31 is closed and any flushing water which is in vessel 1 is drained out by opening valve 13, leaving a substantially dry resin in the vessel. Once the water in vessel 1 is completely drained, valve 13 is closed, valve 31 is opened and make-up water is pumped into vessel 1 at a constant rate as set by the constant flow transmitter 33. The level of the water is monitored by level measuring device 15 as the water rises in the vessel 1. The level measurement indications from level measuring device 15 can be manually logged on a regular, periodic basis or they can be automatically logged by a conventional strip chart recorder 37 which can be appropriately connected to the level measuring device 15 for receiving the output signal thereof.

In accordance with the method of the invention, when a decrease is observed in the rate of change of the water level in the vessel 1, this signifies that the water has reached the surface level of the resin in the tank and has begun filling the unoccupied portion of the vessel volume above the resin surface.

As an alternative to logging the output of level measuring device 15, either manually or by strip chart recorder 37, it is also possible, within the principles of the invention, to connect an electronic circuit including a differentiator to the output of level measuring device 15 which automatically detects the decrease in the rate of change of the rising water level in the tank and produces an output indicative of the water level at that point in time.

By calibrating the height of the vessel against the volume of the vessel portion below each respective height, the resin level can be immediately converted to a volume measurement of the bulk resin contained in the vessel. If the void fraction of the bulk resin in the vessel is known, the volume of the vessel occupied by solid resin can be determined by substracting the void fraction from the volume indicated by the water level. Alternatively, the volume of solid resin can be determined by measuring the time elapsed between the commencement of the flow of water into vessel 1 at the constant flow rate and the time at which the decrease in the rate of change of the water level occurs. The product of the constant flow rate and the elapsed time gives the volume of make-up water added to the vessel up to the resin surface level. The volume of the vessel occupied by the solid resin can then be calculated by substracting the make-up water volume from the total volume of water and resin corresponding to the water level at the time of the decrease in the rate of change of the water level.

The accuracy of the resin level measurement according to the invention is a function of the input flow rate of the make-up water and the data collection interval if the data is manually logged. The table below provides the measurement accuracy for various flows and data collection intervals with respect to a vessel having the shape of a vertical right circular cylinder, capped with hemispherical heads and having an inside diameter of 96 inches, a height of 154 inches and a total volume of 550 cubic feet, and wherein the bulk material in the vessel comprises resin beads having an average particle size of 200 microns and a void fraction of 33%.

| FLOW RATE Gallons/Minute | DATA COLLECTION INTERVAL MINUTES | ACCURACY OF MEASUREMENT % |
| --- | --- | --- |
| 25 | 1.0 | 0.6 |
| 25 | 0.5 | 0.5 |
| 50 (Recommended) | 1.0 | 1.2 |
| 50 | 0.5 | 0.6 |
| 100 | 1.0 | 2.4 |
| 100 | 0.5 | 1.2 |

The use of a strip chart recorder for continuously monitoring the change in level would result in an accuracy of 0.5%, regardless of which flow rate is chosen.

It will be understood that the above description of the present invention is susceptible to various modifications, changes and adaptations, and the same are intended to be comprehended within the meaning and range of equivalence of the appended claims.

I claim:

1. A method for remotely measuring the surface level a bulk material which is flushed via a flushing liquid into a storage vessel, wherein the bulk material comprises loose particles, with adjoining particles defining interstices therebetween, the vessel has a liquid inlet, and a liquid level measuring device is operatively associated with the vessel for producing an indication of the level of a liquid in the vessel, said method comprising:
   substantially removing any flushing liquid that may be present in the vessel;
   adding liquid to the vessel at a constant flow rate through the liquid inlet, the liquid progressively filling the interstices from the bottom of the vessel toward the surface level of the bulk material;
   monitoring the rate of change of liquid level indications of the level measuring device over time; and
   determining the level at which the rate of change of liquid level in the vesssel decreases, such determined level representing the level of bulk material in the vessel.

2. A method according to claim 1, including providing a recording means for automatically recording the rate of change of level indications of the liquid level measuring device.

3. A method according to claim 1, and for additionally determining the volume of the bulk material in the vessel, the vessel enclosing a known volume of space and each level of the vessel corresponding to a predeterminable partial vessel volume below such level, and further comprising:
   monitoring the elapsed time between the commencement of said adding step and the time at which the rate of change of liquid level in the vessel decreases, the product of the constant flow rate of liquid and the elapsed time representing the volume of liquid added to the vessel;
   obtaining the partial vessel volume occupied by the liquid and bulk material at the determined level of said determining step; and
   calculating the volume of the solid portion of the bulk material in the vessel by subtracting the volume of liquid added in the vessel from the partial vessel volume occupied by liquid and bulk material.

* * * * *